United States Patent [19]

Amdahl et al.

[11] Patent Number: 4,551,797

[45] Date of Patent: Nov. 5, 1985

[54] APPARATUS FOR REVERSE TRANSLATION

[75] Inventors: Gene M. Amdahl, Atherton; Donald L. Hanson, Los Altos Hills; Ronald K. Kreuzenstein, Sunnyvale; Gwynne L. Roshon-Larsen, Saratoga; Gary A. Woffinden, Scotts Valley, all of Calif.

[73] Assignee: Amdahl Corporation, Sunnyvale, Calif.

[21] Appl. No.: 528,091

[22] Filed: Aug. 3, 1983

[51] Int. Cl.$^4$ .................................. G06F 13/00
[52] U.S. Cl. ................................................ 364/200
[58] Field of Search ... 364/200 MS File, 900 MS File

[56] References Cited

U.S. PATENT DOCUMENTS 4,096,573 6/1978 Heller et al. .................. 364/200
4,136,385 1/1979 Gannon et al. ................ 364/200

Primary Examiner—Raulfe B. Zache
Attorney, Agent, or Firm—Fliesler, Dubb, Meyer & Lovejoy

[57] ABSTRACT

Disclosed is an apparatus for storing data wherein there are at least two storage units which are addressed by different addressing schemes. The primary storage unit is addressed with a unique addressing scheme while the other storage units are addressed with a scheme wherein more than one of the other addresses may map to a single unique primary address. The apparatus for storing data includes a mechanism for translating all of the unique primary addresses to all of the other addresses which map to that unique primary address.

17 Claims, 4 Drawing Figures

APPARATUS FOR REVERSE TRANSLATION

FIELD OF THE INVENTION

This invention relates to the storage of data in data processing machines. Particularly the field of this invention is addressing mechanisms for accessing data in storage facilities of data processing machines.

BACKGROUND OF THE INVENTION

Large data processing machines normally have more than one storage facility. Usually these include a fast access buffer storage unit and an large capacity main storage unit. The fast access buffer is used to decrease the apparent access time to data stored in the machine. The buffer operates by retrieving blocks of data from the main storage unit and holding the data ready for access by the central processing unit of the machine. The machine accesses the data from the buffer and in turn may update the data stored in the buffer from the main storage unit in an effort to keep currently active data in the buffer.

In addition to having more than one storage facility in a data processing machine, often the machine will use more than one addressing scheme for accessing the data in the storage facilities. There is always the system address which uniquely locates a given set of data within the main storage facility of the data processing machine. In addition, there may also be other non-unique addressing schemes, referred to as virtual addresses, which are assigned to a given CPU within the machine or a given programmer. The virtual addresses can be used to increase the apparent allocated storage space to a given user by disassociating the user to a certain degree from the system address. In this manner a given user may be actually allocated only a part of the system main storage facility while having at its disposal for programming a much larger set of virtual addresses. In this type of addressing scheme, of course, more than one virtual address may actually access the same set of data within the mainstore. That is, more than one virtual address may translate into the same system address. Those virtual addresses which translate to the same system address are referred to as synonym virtual addresses.

Data processing machines which use virtual address to system address addressing schemes normally include a translation mechanism which stores tables that are accessible by the virtual address, or some function thereof, which keep information necessary to translate the virtual address to the system address. In this manner, the main storage facility which is accessed only by the system address can be accessed by the programmer using the virtual address.

Because a given system address may be the translation of more than one virtual address, the need may arise for computing all the virtual addresses which map to the given system address. For instance, in a data processing machine which allows direct access to the fast access buffer using the virtual address, such as is described in the patent application entitled "VIRTUALLY ADDRESSED CACHE" invented by Gene Myron Amdahl, Donald Laverne Hanson, and Gary Arthur Woffinden, filed contemporaneously herewith and owned by a common assignee, there is a need for a mechanism for translating the system address to all the synonym virtual addresses which map to that given system address. This need arises because data within the fast access buffer may be operated upon or changed in some manner at one virtual address location without directly making the same changes in all the synonym virtual addresses. So the translation from system address to all synonym virtual addresses must be performed in order to assure that data contained in the fast access buffer and all the synonym virtual address locations is accurate.

SUMMARY OF THE INVENTION

In accordance with the foregoing, the present invention provides a mechanism for carrying out the translation from the system address to all the synonym virtual addresses for a given set of data. This function will be termed throughout this application as reverse translation in order to distinguish it from the translation of the virtual address to the system address.

Thus in a data processing machine, the present invention provides an apparatus for storing data comprising a primary storage facility, such as a main storage unit, for storing data with a primary addressing means for uniquely addressing the data within the primary storage means with unique primary addresses. The apparatus for storing data further includes a secondary storage means, such as a fast access buffer unit, for storing data in communication with the primary storage means so that data may be transferred between the primary storage means and the secondary storage means and vice versa. The secondary storage means is addressed with a secondary addressing means for addressing the data within the secondary storage means with secondary addresses that are not unique to a given set of data. Thus translation means are provided for translating the secondary addresses to the unique primary addresses to uniquely address the sets of data within the machine. Finally reverse translation means are provided for translating each of the unique primary addresses to all the synonym secondary addresses which map to the unique primary address.

The primary addresses include a page address, a line address, and a byte address which uniquely identify the location of the data. The page address may identify, for instance, blocks of 4,096 bytes (4K bytes) of data while the line address identifies a block of 32 byte addresses; and the byte address identifies the location of a set of 8 bits. Other progressive breakdowns of the size of the sets of data identified by the page, line, and byte addresses can be used.

The translation means includes a page table storage means for storing the information necessary to translate the secondary address to the page address of the primary address. The translation means further includes a line table storage means for storing the information necessary for assuring that the information in the page table storage means matches the line accessed in the secondary storage means. Thus the translation means identifies the line of data within a primary address page, and the uniquely identifies the unique primary address page, within the primary storage unit for the requested line of data.

The reverse translation means includes a page table search means for searching the page table storage means for synonym secondary addresses along page boundaries. Further the reverse translation means includes a line table search means which searches the line table storage means for all synonym secondary addresses along line boundaries. Thus the reverse translation means searches the page table storage means for all translations to a given page. Upon finding translations to a given page, the reverse translation means searches the line table storage means for the given line within the page.

Thus it can be seen that the present invention provide a reverse translation means which first searches along page boundaries through a page table storage means for secondary addresses which translate to a given primary address page, and then upon finding a synonym page address, searches the line addresses in the line table storage means for synonym lines to thereby identify all the secondary addresses which translate to a given unique primary address.

DETAILED DESCRIPTION

With reference to the drawings, detailed description of the preferred embodiment of the present invention is provided.

Figure 1:
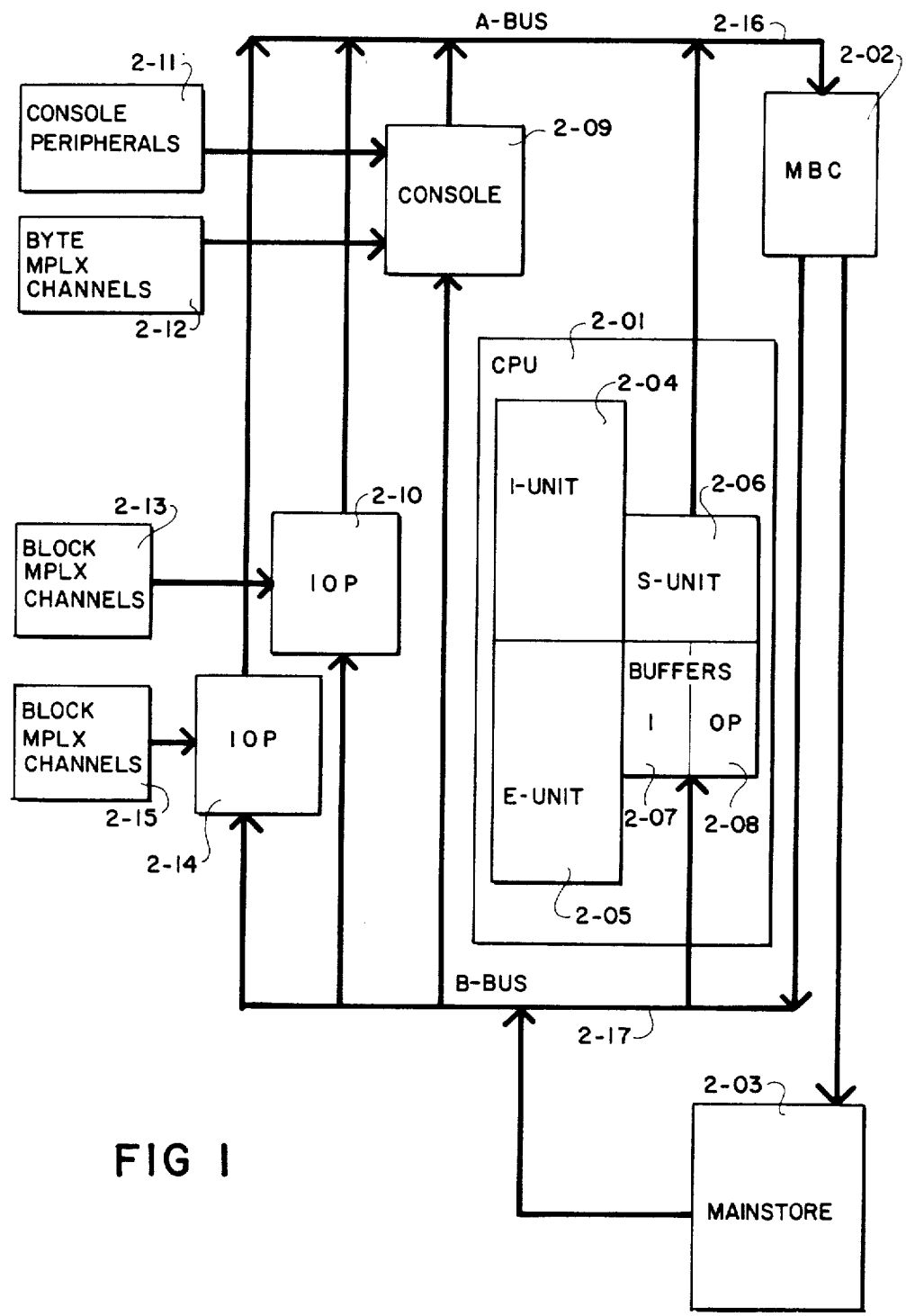
FIG. 1 is a system overview of a data processing machine and includes present invention.

FIG. 1 shows a block diagram of a system overview of the data processing machine D which employs the present invention. The present invention is most closely associated with the central processing unit 2-01, the memory bus controller 2-02, and a primary storage means or main storage unit 2-03. The central processing unit 2-01 includes five subparts as follows: the instructions unit 2-04 (I-UNIT) which fetches, decodes, and controls instructions and controls the central processing unit 2-01; the execution unit 2-05 (E-UNIT) which provides computational facilities for the data processing machine D; the storage unit 2-06 (S-UNIT) which controls the data processing machine's instruction and operand storage and retrieval facilities; a secondary storage means or the instruction buffer 2-07 which provides high-speed buffer storage for instruction streams; and a secondary storage means or the operand buffer 2-08 provides high-speed buffer storage for operand data.

Other major parts of a data processing machine as shown in FIG. 1 include the input-output processor (IOP) 2-10 which receives and processes input-output requests from the central processing unit 2-01 and provides block multiplexer channels; the console 2-09 which communicates with the central processing unit 2-01 to provide system control and byte multiplexer channels; the memory bus controller (MBC) 2-02 which provides main memory and bus control, system wide coordination of functions and timing facilities; and the main storage unit 2-03 which provides system large capacity memory. A second input-output processor 2-14 and additional multiplexer channels 2-15 may be included as shown in FIG. 1. Though not shown in the Figures, the data processing machine D of the present invention may have additional CPU's.

The data processing machine shown in FIG. 1 employs a dual bus structure: the A-bus 2-16 and the B-bus 2-17. The A-bus 2-16 carries addresses and data from the console 2-09, the input-output processor 2-10, and the central processing unit 2-01 to the memory bus controller 2-02. The B-bus 2-17 carries data from the memory bus controller 2-02 and the main storage unit 2-03 to the console 2-09, the input-output processor 2-10 and the central processing unit 2-01.

For a more detailed description of the system overview shown in FIG. 1 refer to the related application entitled "VIRTUALLY ADDRESSED CACHE" invented by Gene Myron Amdahl, Donald Laverne Hanson and Gary Arthur Woffinden, filed contemporaneously herewith and owned by a common assignee.

The present application is concerned primarily with the addressing of data located in the secondary storage means or high speed buffers 2-07, 2-08 and in the primary storage means or mainstore 2-03, where the mainstore 2-03 is addressed with a primary addressing means that uniquely addresses the data in the mainstore 2-03; and the buffers 2-07, 2-08 are addressed with a secondary addressing means. The secondary addressing means of the buffers 2-07, 2-08 may allow more than one secondary address, or virtual address, to translate to a given uinique primary address, or system address.

In this situation, the need arises for a means for reverse translation whereby a primary address is translated to all the secondary addresses which in turn will translate to that given unique primary address. The reverse translation means is necessary because the non-unique secondary addresses, or virtual addresses, allow more than one copy of a given line of data to reside in the buffers 2-07, 2-08. When additional CPU's (not shown) are used, the given line may reside as well in buffers associated with the additional CPU. Further, because the buffers 2-07, 2-08 are accessed directly in the preferred embodiment with the virtual address, more than one program may request the same line of data using different virtual addresses and process the line of data. If one of the requested programs modifies the line of data, the other programs using the same line at different virtual addresses must see the modification.

Figure 2:
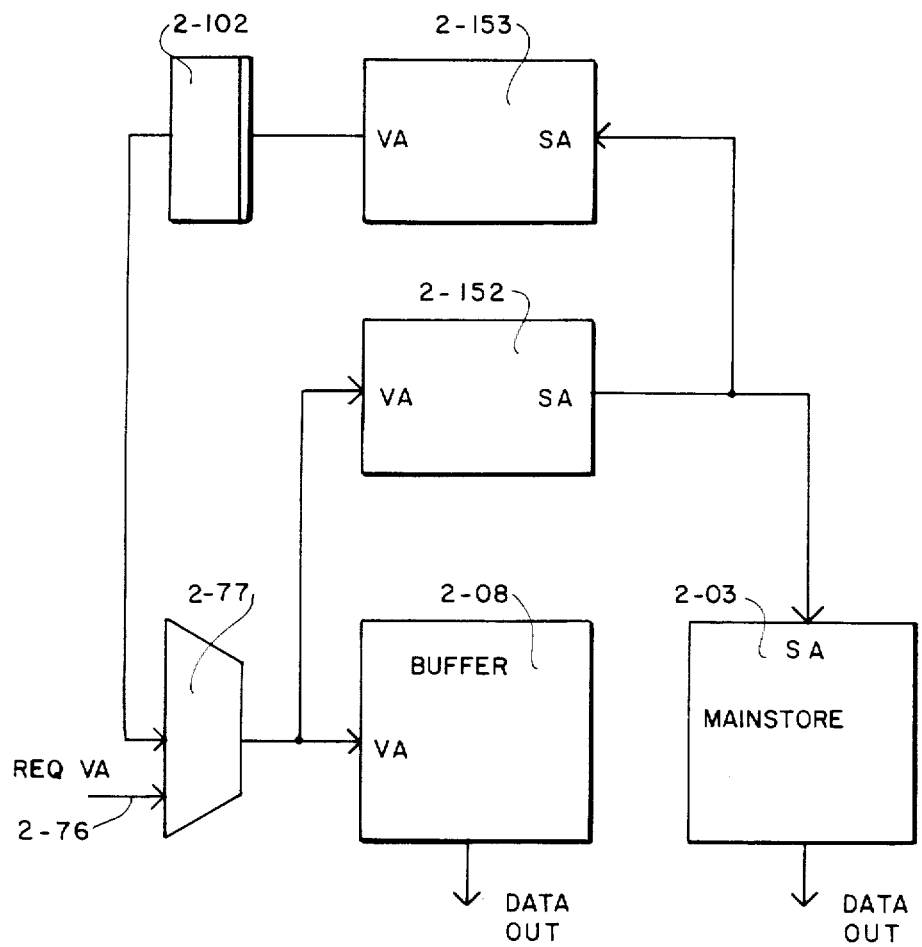
FIG. 2 is a simplified schematic diagram showing the address paths of the present invention.

FIG. 2 is a simplified schematic diagram showing the address path of the present invention where the need for reverse translation arises out of the use of a buffer 2-08 which is addressed using a virtual address (VA) while the mainstore 2-03 is addressed using a system address (SA). In this situation, a requested virtual address 2-76 is presented at the virtual address selector 2-77 for accessing data from the buffer 2-08 (in this example we will use only the operand buffer 2-08). The virtual address selector 2-77 selects the requested virtual address 2-76 presented to it and addresses the buffer 2-08 for the line represented by that virtual address 2-76. While the virtual address 2-76 is presented in the buffer 2-08, the virtual address 2-76 is also presented to a translation mechanism 2-152 which searches tables present in the translation mechanism 2-152 for the system address (SA) corresponding to the requested VA 2-76. If the line is present in the buffer 2-08 then it is presented to the requesting unit. If the translation mechanism 2-152 has a translation to a system address in its tables and the data is not in the buffer 2-08, then the mainstore 2-03 is accessed for the data and a process is begun to move the data out of the mainstore 2-03 into the buffer 2-08 at the requested virtual address 2-76. While the process is begun for retrieving the data from the mainstore 2-03, the system address (SA) is presented to a reverse translation mechanism 2-153 where the virtual addresses are determined that are synonyms to the requested VA 2-76, that is VA's which translate to the presented system address. If a synonym virtual address is found, then data in the buffers 2-08 at that synonym virtual address is examined in order to determine whether it is a more recent version of the requested data.

In the preferred embodiment there are valid bits associated with each line of data in the buffer that indicate the state of the line in the buffer 2-08 with respect to other versions present in the system. In the operand buffer 2-8, the data as indicated by the valid bits may be written in four states: "invalid" meaning the data is not valid; "public" meaning the data is valid but may exist at other locations so it may be only read; "private" meaning that only one copy of the line exists outside the mainstore 2-03 and it may be modified; and "modified" meaning only one copy of the line exists outside the mainstore 22-03 and it is different than the line at its corresponding system address in mainstore 2-03.

Synonym virtual addresses are presented to the port 2-102 where they are held until the virtual address selector 2-77 accepts the synonym virtual address for presentation to the buffer 2-08. When the synonym virtual address is accessed in the buffer 2-08, and the valid bits indicate that it is modified data which is the most up-to-date version of the data, the data is sent to the system address in the mainstore 2-03 and provided at the requested virtual address in the buffer 2-08. If the data at the synonym virtual address is not modified, then the version in the mainstore 2-03 at the system address will be the same as data at the synonym virtual address; so the synonym virtual address may be erased or left alone, depending on the purpose for which the requested virtual address 2-76 will be used as explained in more detail below.

Therefore the present invention provides an apparatus for reverse translation of a requested system address 2-76 to all synonym virtual addresses which include a copy of the data from the system address. The entry at the virtual synonym addresses may then be examined to determine the most up-to-date version of the data identified by the system address.

In the preferred embodiment, the reverse translation means 2-153 of the present invention is utilized in connection with the operand buffer 2-08 and instruction buffer 2-07. The instruction buffer 2-07 is set up in the preferred embodiment so that the valid bits only indicate whether the instruction is public or invalid. Because the possibility of a modified line does not exist in the instruction buffer 2-07, the operation resulting from an access requiring a reverse translation carried on in the instruction buffer 2-07 is somewhat simpler than that associated with the operand buffer 2-08. Thus, the preferred embodiment will be described with reference to the operand buffer 2-08 in order to most completely describe the invention. Note that a virtual address in the operand buffer 2-08 may have a synonym in the instruction buffer 2-07.

Figure 3:
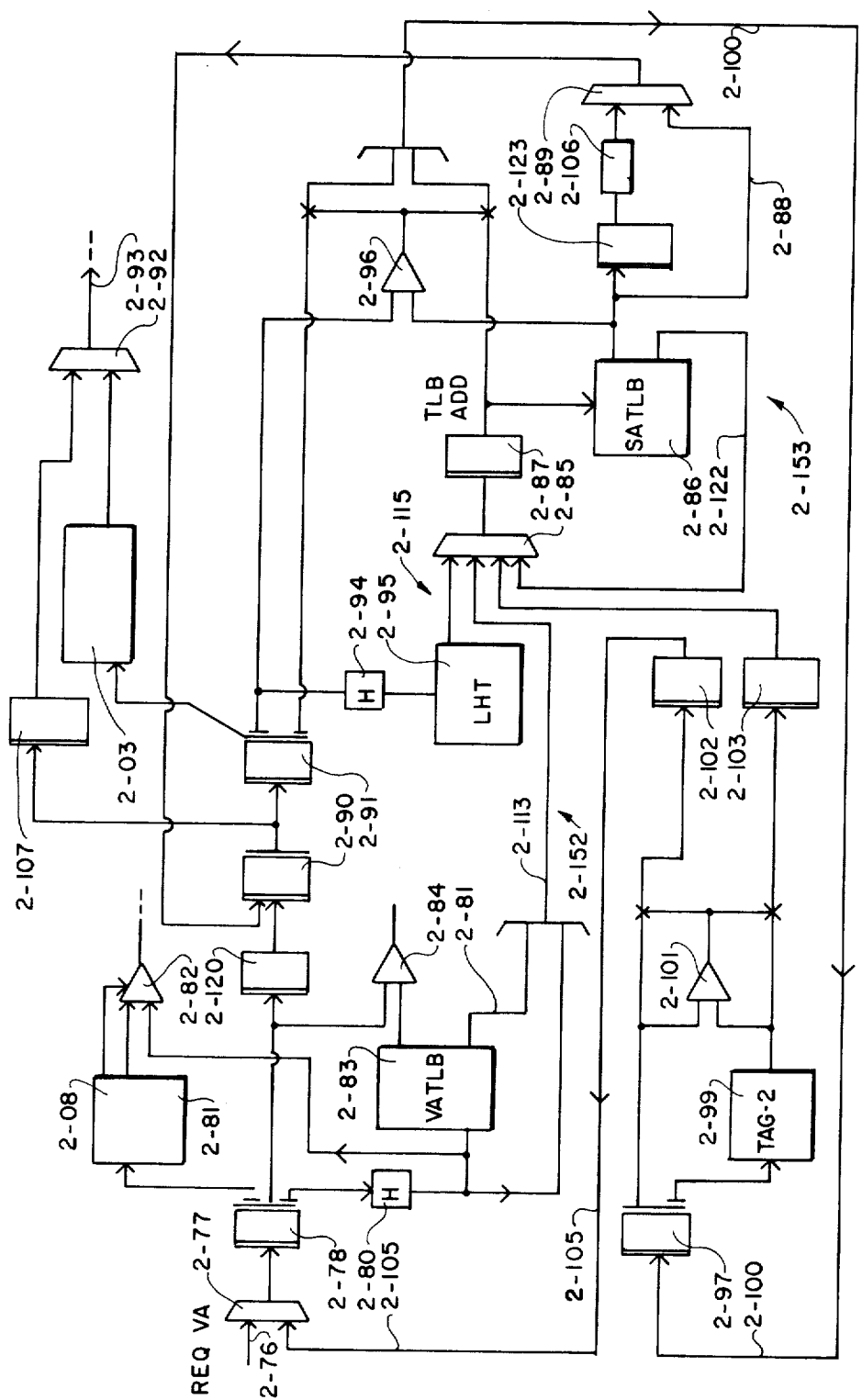
FIG. 3 is an expanded schematic diagram showing the address paths of the preferred embodiment of the present invention.

A more detailed schematic diagram showing the address paths of the preferred embodiment of the present invention is shown in FIG. 3. For the purposes of description, the address paths shown in FIG. 3 will be described with reference to the situation in which a data line at a virtual address is requested by the central processing unit 2-01 from the operand buffer 2-08 and it is found that the line of data at the requested virtual address 2-76 is not present in the buffer 2-08, but that the translation means 2-152 includes a translation to the system address for the requested virtual address 2-76.

The translation may exist in the translation means 2-152 even when the data line is not present in the buffer 2-08. The details of the translation mechanism 2-152 will be described as a request flows through the diagram.

A requested virtual address 2-76 is presented to a virtual address selector 2-77 which selects the virtual address to be presented to the operand address register 2-78 depending on control (not shown) which will calculate the priority of a given request for data from the operand buffer 2-08. So assuming our requested virtual address 2-76 is selected by the virtual address selector 2-77 for presentation to the operand address register 2-78, the data at the requested virtual address 2-76 will be accessed in the buffer 2-08.

In the preferred embodiment, a system address page consists of 4096 bytes (4K page) or 2048 bytes (2K page) in lines of 32 bytes each. A system address is 31 bits long. Bits 1-19 for a 4K page uniquely identify a page within the mainstore 2-03 while bits 20-31 will uniquely identify the line and byte of the data. For a 2K page size the high order bits necessary to identify the page of data within the mainstore will be bits 1-20. However for the purposes of this description we will assume a 4K page size.

The requested virtual address 2-76 in the operand address register 2-78 will be broken down into the lower order bits, 18 to 26, which will be used to locate the line within the operand buffer 2-08, and the high order bits, 1 to 19, which will be used to locate the translation from the requested virtual address 2-76 in the operand address register 2-78 to the system address page. First the low order bits, 18-26, are used to access the operand buffer 2-08. The buffer 2-08 is organized along line boundaries so it is a line table storage means. Each line of data accessed in the buffer 2-08 will have associated with it the tag-1 field 2-81 which will contain the TLB address of the TLB system address entry used to fetch the line from the mainstore. The TLB, or translation lookaside buffer, consists in the preferred embodiment of a virtual address portion, VA TLB 2-83, and a system address portion, SA TLB 2-86, which together contain the virtual address, system address, storage protection information, and other information necessary for translating from a virtual to system address. Whenever there exists a line in the buffers 2-07, 2-08 that is accessible to the central processing units, the VA TLB 2-83 and SA TLB 2-86 hold a translation for the line. However a translation for the line may reside in the VA TLB 2-83 and SA TLB 2-86 when the line is not in the buffers 2-07, 2-08 because the TLB operates on page boundaries and updating of entries in the TLB is controlled differently than updating the line of data in the buffers 2-07, 2-08. The VA TLB 2-83 and SA TLB 2-86 are accessed using the same TLB address, except that the SA TLB 2-86 requires an additional addressing bit called the flipper bit described below. The TLB is a page table storage means because it stores translations along page boundaries.

As the low order bits access the buffer 2-08, the high order bits 1-19 are presented to a TLB hash 2-80 which generates the TLB address for the given requested virtual address 2-76 located in the operand address register 2-78. Upon output from the TLB hash 2-80, the TLB address is compared with the TLB address that is found in the tag-1 2-81 which was associated with the data line in the buffer 2-08. If the line in the buffer 2-08 that was accessed with lower order bits 18-26 of the requested virtual address 2-76 has an entry in the tag-1 2-81 that matches the TLB address generated by the TLB hash 2-80 of the high order bits 1–19, then the line comparator 2-82 will indicate that the requested virtual address line may reside in the buffer 2-08. If the virtual address in the VA TLB 2-83 also matches the requested virtual address 2-76, then the line is present in the buffer 2-08. However, the present example concerns the situation wherein the requested line of data is not in the buffer or the line is invalid; so the TLB address which results from the TLB hash 2-80 of the high order bits 1–19 does not match the TLB address found in the tag-1 2-81 associated with the data line in the operand buffer 2-08 that was addressed by the low order bits 18–26.

The virtual address accessed in the VA TLB 2-83 by the TLB hash 2-80 of the high order bits is compared with the requested virtual address 2-76 at the translation comparator 2-84. A match at the translation comparator 2-84 and at the line comparator 2-82 will occur if the requested line is in the buffer 08. The translation comparator 2-84, however may indicate that a translation exists in the VA TLB 2-83 and SA TLB 2-86 even though the line comparator 2-82 fails to get a match. If the translation exists, then the system page address is read from the SA TLB 2-86.

The page translation present in the translation lookaside buffer (VA TLB 2-83 and SA TLB 2-86) is sufficient to generate the complete system address in the preferred embodiment because (assuming 4K page size) the low order bits 20–31 of the virtual address are the same as the low order bits 20–31 of the system address. Thus if the lower order bits 20–31 of the virtual address are preserved, the translation mechanism need only generate the high order bits 1–19 in order to complete the translation to the system address. The translation means 2-152 completes its task by delivering the system page address from the SA TLB 2-86 to the mainstore address register 2-91.

Thus, if it has been discovered at the translation comparator 2-84 that a virtual-to-system page address translation is present in the VA TLB 2-83 and SA TLB 2-86, the TLB address resulting from the hash 2-80 of the high order bits of the requested virtual address 2-76 in the operand address register 2-78 is presented along the line 2-113 to the TLB address selector 2-85. Also presented along with the TLB address is a flipper bit 2-86, in the preferred embodiment. The flipper bit 2-86 selects one of two system addresses present in the SA TLB 2-86. The SA TLB 2-86 contains two system addresses at a given TLB address, only one of which is a currently accessible system address for the purposes of translation. The flipper bit 2-86 selects the active system address and is always used in accessing the SA TLB 2-86. The inactive system address is used in controlling the eviction of the TLB entries as described in more detail in the related patent application entitled "VIRTUALLY ADDRESSED CACHE" invented by Gene Myron Amdahl, Donald Laverne Hanson and Gary Arthur Woffinden, filed contemporaneously herewith and owned by a common assignee.

Upon selection by the TLB address selector 2-85, the TLB address resulting from the hash 2-80 of the high order bits 1–19 of the requested virtual address 2-76 along with the flipper bit 2-86 is latched in the TLB address register 2-87 and presented to the SA TLB 2-86. The system address page bits 1–19 for the translation are accessed at the TLB address from the SA TLB 2-86 and presented along the address line 2-88 to the selector 2-89 and selected for presentation to the MBC register 2-90.

The requested virtual address 2-76 is clocked over to the register 2-120 for timing purposes. Then the system line address consisting of the low order bits 20–31 is presented to the MBC register 2-90 to complete the translation to the system address.

Upon generation of the system address, it is transferred to the mainstore address register 2-91 and the data is accessed from the mainstore 2-03, presented to the data select 2-92 and then to the requested virtual address 2-76 in the buffer 2-08 along the data line 2-93.

So far we have demonstrated the mechanism for translating a requested virtual address 2-76 into a system address for recovering the data from the mainstore 2-03 and presenting it back to the buffer 2-08 at the requested virtual address 2-76. In this situation, a reverse translation is necessary in order to assure the integrity of the data presented from the mainstore 2-03 to the requested virtual address 2-76. In other words, the machine must assure that the data written into the requested virtual address 2-76 is the most up-to-date version of the data. Because the data at the requested virtual address 2-76 may have synonym lines present in the operand buffer 2-08, instruction buffer 2-07, or other CPU's (not shown) which have been operated on or modified in some way, as indicated by their valid bits, the machine must search for those synonyms and check the status of those synonyms, and return data to requestor if the line is a more recent line than the one in mainstore 2-03. Further if the data once written at the requested virtual address 2-76 is to be modified or operated upon by the user, then the machine must assure that data at all the synonym virtual addresses will be made unavailable for use by others. Thus there is a need for a reverse translation mechanism 2-153 in the preferred embodiment.

The reverse translation means 2-153 therefore starts at the mainstore address register 2-91 with a system address and calculates all synonym virtual addresses. In the preferred embodiment, the reverse translation means 2-153 is implemented with a linked list searching means 2-115 associated with the SA TLB 2-86. Because the SA TLB 2-86 is utilized, the search proceeds along page boundaries at the first level and can be termed a page table search means. Thus the high order bits 1–19 of the system address are presented to a list hash 2-94 which generates a list header table address for accessing a list header table 2-95. The list header table 2-95 contains the first TLB address of a linked list of all system addresses in the SA TLB 2-86 which hash to the same list header table address. Thus the first entry searched in the SA TLB 2-86 will occur at the TLB address generated in the list header table 2-95. The TLB address from the list header table 2-95 is presented to the TLB address selector 2-85 for access to the TLB address register 2-87. Upon access to the TLB address register 2-87, the first entry in the list will be accessed in the SA TLB 2-86. The system address located at the first list entry in the SA TLB 2-86 is then compared with the high order bits 1–19 of the system address in the mainstore address register 2-91 at the synonym page comparator 2-96.

Assuming that the first entry in the list is not the only entry in the list, the TLB address of the first entry in the list will also access a pointer TLB address which consists of a TLB address of the next entry in the linked list. The TLB address of the next entry will be presented along the line of 2-122 through control shown in more detail in FIG. 4 back to the TLB address selector 2-85. Thus the next entry in the linked list is accessed in the SA TLB 2-86 and compared with the system address in the mainstore address register 2-91. Further details of the linked list implementation of the reverse translation will be described below.

Upon discovering a synonym page at the synonym page comparator 2-96, the TLB address of the synonym page is presented along with low order bits 20–26 of the system address in the mainstore address register 2-91 to the tag-2 address register 2-97. In the preferred embodiment the tag-2 2-99 contains a duplicate of information contained in the tag-1 2-81 that is used for the reverse translation. Thus, the tag-2 2-99 is a line table storage means that is searched with line table search means described below. Because the function of the TLB hash 2-80 which computes a TLB address leaves bits 18 and 19 invariant from the virtual address that generates the TLB address, the bits 18–28 written into the tag-2 address register 2-97 will be identical to the bits 18–28 of the synonym virtual address. Because the reverse translation mechanism 2-153 has discovered that a line from a synonym page may exist in the buffer 2-08 through its search of the SA TLB 2-86, the search need only now search the operand buffer 2-08 for the line which matches on low order bits of requested virtual address 2-76 (the requested line in that synonym page). If the original request for data was generated by a line missing in a buffer, then the reverse translation means 2-153 will always find at least one synonym page address for which to search the buffer 2-08, as this system address was used to generate the request from mainstore 2-03.

As mentioned above, the tag-2 2-99 in the preferred embodiment is an identical copy of the information in tag-1 2-81 which is associated with the data lines in the buffer 2-08. Thus the reverse translation means 2-153 only searches tag-2 2-99 for an entry which matches along the low order bits 18–26 with the address in the tag-2 address register 2-97. In this manner, the tag-1 2-81 in the buffer 2-08 is available for use by other accesses to the buffer 2-08 while reverse translation means 2-153 is using the tag-2 2-99.

Thus the bits 18–26 access the tag-2 2-99 in a process which duplicates the access of tag-1 2-81 by a requested virtual address 2-76. At the tag-2 address determined by the bits 18–26 of the address in the tag-2 address register 2-97, a TLB address will be read. If the TLB address located in the tag-2 2-99 at the address generated by bits 18–26 matches the TLB address of the synonym page presented to the tag-2 address register 2-97 over the line 2-100, then the line exists comparator 2-101 indicates that a synonym line is present in the buffer 2-08.

Once the reverse translation means 2-153 determines the presence of a synonym line in the buffer 2-08, then control determines what must be done with the synonym line in order to assure the integrity of the data in the buffer 2-08. If the synonym line is modified as indicated by the valid bits associated with it in the tag-2 2-99, then the synonym line must be provided to the requested virtual address 2-76. If the synonym line is public or private and the requested virtual address 2-76 is requested in the private state, then the synonym line must be written invalid or erased. If the synonym line is public and the requested virtual address 2-76 is requested in the public state, then the synonym line may be left alone. If the synonym line is private and the requested virtual address is requested public, then the synonym line must be changed to a public state or erased. Other controls decisions may be fashioned as the need arises for the user of the present invention.

To access a virtually addressed synonym line for operation upon, as determined by control, the address bits 20-28 plus the TLB address that were presented to the tag-2 address register 2-97 are written into the data integrity port 2-102. The high order bits 10 to 19 of the synonym virtual address in the tag-2 address register 2-97 consist of the TLB address of the synonym virtual address. The low order bits 20 to 28 are the same for all synonyms in 4K page size. Likewise the TLB address of the synonym virtually addressed line is written into the move-out TLB pointer register 2-103. If the synonym virtual address contains a modified version of the data line that exists in the system address in mainstore 2-03, then the move-out TLB pointer register 2-103 is selected at the TLB address selector 2-85 for the move-out procedures which update the data line in the mainstore 2-03, and return it to the requested virtual address 2-76.

As discussed above, if the synonym line is a modified line which is the most up-to-date version of the data requested by the requested virtual address 2-76, then control presents the synonym virtual address along synonym line 2-105 to the virtual address selector 2-77 for a presentation to the buffer 2-08 in order to access this most up-to-date version of the line from the synonym address to be moved out of the buffer 2-08 and returned to the requestor. When the virtual address selector 2-77 presents the synonym virtual address to the operand address register 2-78, the hash 2-80 will see the TLB address in bit locations 10–19 of the address in the operand address register 2-78. The hash 2-80 will pass this TLB address through the hash unaltered for presentation to the VA TLB 2-83 because of the function of the TLB address hash 2-80 (the pointer TLB address stored in the SA TLB 2-86 is already hashed). The lower order bits 18–26 will be the accurate copy of the low ordre bits of the synonym virtual address.

Meanwhile control will direct the TLB address of the synonym virtual address from the move-out TLB pointer register 2-103 through the TLB address selector 2-85 to the TLB address register 2-87 to access the system page address from the SA TLB 2-86 which passes through the system address save register 2-123 and through a error checking and correcting logic block 2-106. The system page address is selected by the system address selector 2-89 for presentation to the MBC register 2-90 to generate the system address page for accessiNG the mainstore 2-03. The line present comparator 2-82 will signal the control to move the synonym virtual address over to the register 2-120 where the low order bits 20–31 are presented to the MBC register 2-90 to complete the system address. If as in this example, the data of the synonym virtual address is a modified version of the line, then control (not shown) will direct data from the buffer 2-08 through the bypass register 2-107 from the synonym virtual address and bypass the mainstore 2-03 to the data selector 2-92 from which this modified version of the data is read into the buffer 2-08 at the requested virtual address 2-76. The mainstore 2-03 is accessed from the mainstore address register 2-91 and the modified version of the data is written into the mainstore 2-03. Data selector 2-92 will not select data from the access to the mainstore 2-03 that was initiated when the requested virtual address translation was presented to the mainstore address register 2-91, and will allow the bypass from the synonym virtual address line containing the updated version of the data.

It therefore can be seen that the preferred embodiment includes a reverse translation means 2-153 for generating the synonym virtual addresses associated with a requested virtual address 2-76. Not described is the situation where a system address is generated and presented to the mainstore address register 2-91 from the system translator which includes the tables for translations of all virtual addresses to all system addresses. The system translator (not shown) will be used to generate the system address in the case that a translation for a given page of system address data is not found in the TLB (VA TLB 2-83 SA TLB 2-86). (See, *IBM System 370 Principles of Operation* (Ninth Edition 1981, File No. S370-01, GA22-7000-8)).

Figure 4:
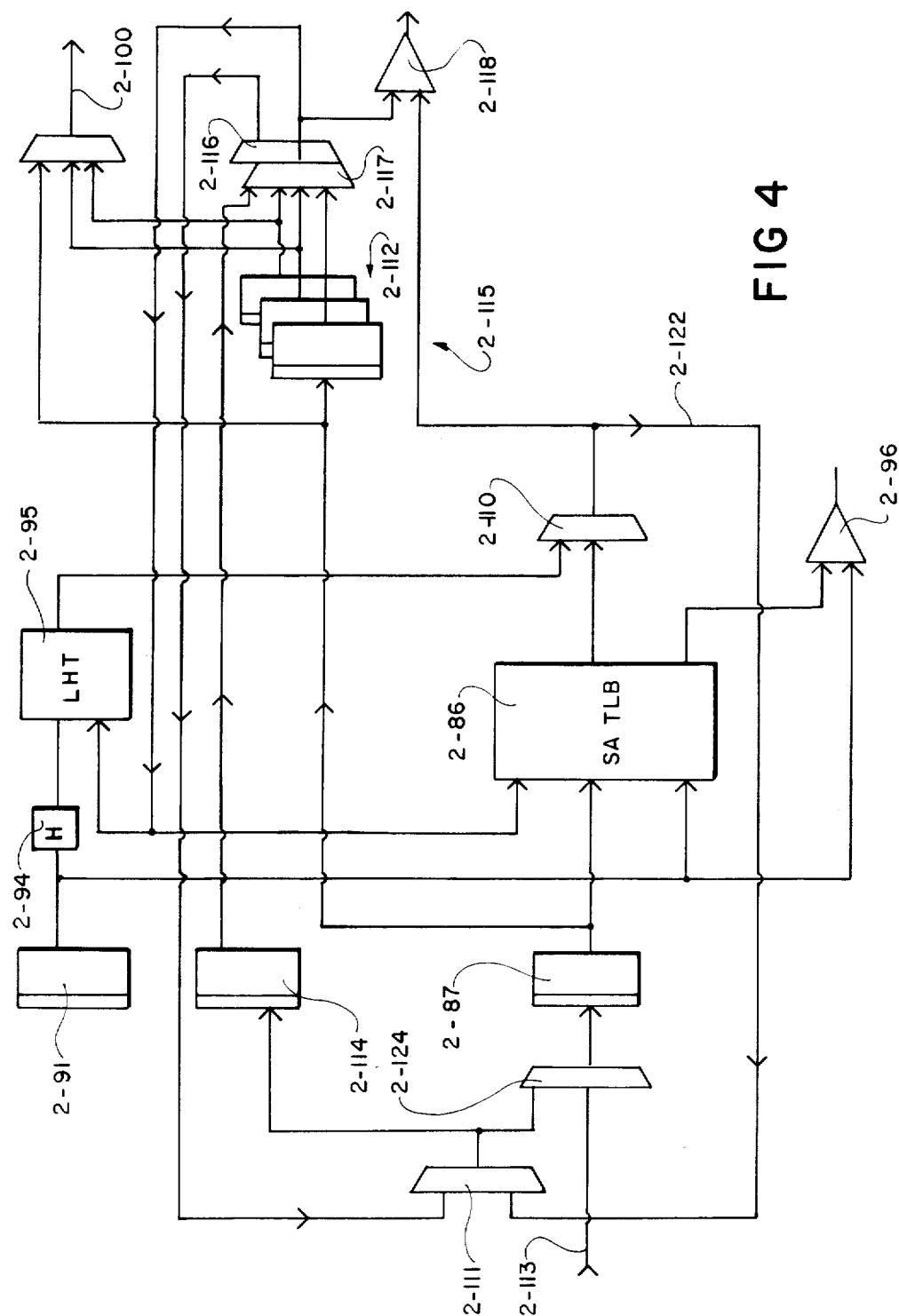
FIG. 4 is a schematic diagram showing the TLB address paths of the linked list implementation of the preferred embodiment.

The present invention pertains most directly to the reverse translation means 2-153 described above with reference to FIG. 3. Reverse translation takes place in the preferred embodiment whenever the mainstore 2-03 is accessed for data from any source including the parts of the CPU 2-01, other CPU's, the IOP's 2-10, 2-14 or console 2-09. The reverse translation begins with a system address in the mainstore address register 2-91, proceeds through a search of the SA TLB 2-86, and then upon discovery of a synonym page proceeds to search the tag-2 2-99 for synonym line. FIG. 4 shows a schematic diagram of the TLB address paths for the linked list implementation of the preferred embodiment. The linked list searching means 2-115 is implemented in the search of the SA TLB 2-86, so the diagram in FIG. 4 represents an expanded view of the address paths including the SA TLB 2-86 portion of the reverse translation means 2-153. The portions of the diagram in FIG. 4 which appear in FIG. 3 will be given like numerals for corresponding parts.

For purposes of the description of the linked list searching means 2-115 for the search of the TLB, assume that a system address exists in the mainstore address register 2-91 for a line of data that is needed by a requestor from mainstore 2-03. As described with reference to FIG. 3, the system address which requires reverse translation first accesses the list header table 2-95 to discover the first entry in a list of system page addresses that are stored in the SA TLB 2-86. The list header table 2-95 is accessed by hashing a subset of the high order bits 1-19 to produce a list header table address from the list header table hash 2-94. The linked lists are associated by the condition that each entry in a linked list must generate the same list header table address upon hash of the subset of high order bits. The ordering of the list is then determined as suits the user. The list need not be kept in a specific order accept that by ordering a list the length of the search necessary can be decreased statistically.

At the address accessed from the hash 2-94 of the mainstore address register entry, a TLB address will be found pointing to the first entry in the list of system page addresses stored in the SA TLB 2-86 with which list the mainstore address register entry is associated. The TLB address from the list header table 2-95 is presented to the first TLB list selector 2-110 which will select the list header table TLB address to the second list selector 2-111. From the second list selector 2-111 the TLB address is presented to the pointer selector 2-124 and stored into the TLB address register 2-87. The first list selector 2-110, second list selector 2-111, and pointer selector 2-124 correspond to the TLB address selector 2-85 shown in FIG. 3.

The SA TLB 2-86 is then accessed from the TLB address register 2-87 and a system page address is read out and matched with the page address in the mainstore address register 2-91 at the system address comparator 2-96 to determine whether a synonym page is present at the TLB address. The search proceeds to the next entry until the end of the list or the end of the search.

Associated with each system address entry in the SA TLB 2-86 is the pointer TLB address of the next entry in a associated list. Thus the TLB address of the next entry in the list is presented to the first list selector 2-110, proceeds across the list line 2-122 to the second list selector 2-111 and into the pointer selector 2-124, and so on for each entry list until the search is stopped.

The linked list search will stop when the system address found that is according to the list ordering greater than the system address in the mainstore address register 2-91, when the end of the list is found, or when a synonym is found which is modified. Other end of list conditions exist such as error conditions, or other search interruptions.

The list has a specific order so that once the search proceeds through the list past the point at which the searched for entry should reside, the search can stop. Likewise in the preferred embodiment, associated with the pointer TLB address is the SA TLB 2-86 is an end bit which if activated indicates to control (not shown) that the end of the list has been reached. The control of the reverse translation means 2-153 further monitors the status of the synonym lines found in buffers 2-07, 2-08, and the type of request generated for the address being searched in order to determine list end conditions.

Because in the preferred embodiment the list entries are associated in a prescribed order, when a new translation must be added to, or an old translation deleted from, the translation means 2-152, the list searching means must search the SA TLB 2-86 to find the proper position in the list. The proper positioning of an entry in the list is determined by manipulation of the pointer TLB address associated with each entry in the SA TLB 2-86.

For the purposes of the description assume that a new translation, system address N, is to be added to the SA TLB 2-86. The TLB address to be associated with the system address N will be determined by the hash of the address and presented to the TLB address selector 2-85 along line 2-113 from the S-unit 2-06. The entry in the list that will precede system address N in the list, the address of system address A, will need to be rewritten so that the pointer TLB address associated with system address A in the SA TLB 2-86 will be the TLB address of the new system address N. Likewise the pointer TLB address to be written with system address N in the SA TLB 2-86 must be the TLB address of the entry that will follow in the list, the address of system address B. The pointer TLB address to the system address B in the SA TLB 2-86 will reside at the entry of system address A. Thus the pointer TLB address associated with system address A should be written into the SA TLB 86 along with system address N in order to preserve the continuity of the list. The diagram below shows a portion of the linked list schematically before and after the addition of the translation for new system address N.

Before:→Addr. A/Ptr B→Addr. B/Ptr X→
After:→Addr. A/Ptr N→Addr. N/Ptr B→Addr. B/Ptr X→

Likewise when entries in the SA TLB 2-86 of the TLB are to be deleted, the TLB address pointer stored with the entry to be deleted, system address D, must be written into the pointer TLB address location stored with the preceding entry in the list, system address A. In this manner, the TLB address pointer stored with system address A after system address D has been deleted will point to the entry following system address D in the list.

With reference to FIG. 4 the update means for adding and deleting entries in the SA TLB 2-86 linked list and preserving the integrity of the linked list will be described. The mainstore address register 2-91 holds the system address entry to be added or deleted from the SA TLB 2-86.

In the case of addition to the SA TLB 2-86, the TLB address of the system address to be added is presented from the S-Unit 2-06, along line 2-113 through the pointer selector 2-124 into the TLB address register 2-87. The system address from the mainstore address register 2-91 will eventually be written at the TLB address presented from the S-Unit 2-06 when the entry is to be added to the TLB. The TLB address of the entry to be added is stored in one of the pointer storage registers 2-112. The linked list of the system address to be added is accessed through the list header table 2-95 and the list is searched. The search which has been started from the list header table 2-95 proceeds through each entry in the list in order. The TLB address of the first entry in the list is read from the list header table 2-95 selected around to the TLB address register 2-87 and stored in one of the pointer storage registers 2-112. A comparison of the system address in the mainstore address register 2-91 to be added to the list is made with the system address at the TLB address accessed by the list search. If the system address in the main storage address register 2-91 would reside at a position further down the list than accessed, then the serach proceeds, using the pointer storage registers 2-112 to save the previous entrys' addresses. The TLB address pointer of the second entry in the list read out of the location of the first entry in the list is then selected around to the TLB address register 2-87 and stored in the pointer storage registers 2-112 while the SA TLB 2-86 is accessed to read the second system address. A comparison is made of the second system address with the system address in the mainstore address register 2-91 to determine whether the search should continue. If the search has not yet reached an entry in the SA TLB 2-86 which would be at a location further down the list than the address in the mainstore address register 2-91, the search of the linked list proceeds, unless the end bit is encountered. The third TLB address will be read out of the SA TLB 2-86 and accessed around to the TLB address register 2-87 where the third TLB address in the list will be stored in the pointer storage register 2-112 replacing the address of the first entry in the list, and so on.

Thus when the entry in the mainstore address register 2-91 is to be added to the list, the pointer storage registers 2-112 will contain the TLB address of system address A which is the entry in the list immediately preceding in the linked list order system address N, the TLB address to system address B which is the entry following system address N, and the TLB address to the system address N which is the address in the mainstore address register 2-91 to be added to the list. Upon access to system address B, the control (not shown) will indicate that system address N should be written in the list before it. Thus the pointer TLB address to system address B is written into the SA TLB 2-86 along with system address N at the TLB address stored in the TLB pointer storage registers 2-112 for system address N. Then the TLB address of the immediately preceding entry, the address of system address A, is accessed and the pointer TLB address to the system address to be added, system address N, is written into the SA TLB 2-86 at the TLB address of the preceding entry in the list, the TLB address of system address A. The information for the VA TLB 2-83 is also written into the VA TLB 2-83 when a new entry is added to the translation means 2-152. Therefore, when system address N is added to the SA TLB 2-86, the pointer TLB address stored with system address A will direct the search to system address N. Further, the pointer TLB address stored with system address N will direct the search to system address B. With the proper information written into the VA TLB 2-83 and SA TLB 2-86 including the updating of pointer TLB addresses, the new translation is completely stored in the translation means 2-152.

For deletion of an entry, the pointer TLB address in the entry to be deleted is simply written back to replace the pointer TLB address of the preceding entry in the list. This entry is accessed by reading the pointer for the preceding entry from the pointer storage registers 2-112 and searchign the list to find the entry. The stored pointer selector 2-116 controls the operations of adding and deleting entries in the SA TLB 2-86 along with the second list selector 2-111.

If the system address to be added to a list in a mainstore address register 2-91 should be the first entry in the list, then the entry accessed from the list header table 2-95 will indicate to the controller that the TLB address pointer in the list header table 2-95 should be replaced by the TLB address of system address in the mainstore address register 2-91 to be added to the list. The TLB address pointer to be stored with the system address to be added to the list is written with the TLB address pointer thta had been previously in the list header table 2-95. If the first entry in the list is to be deleted, then the pointer TLB address from the entry accessed by the list header table 2-95 address is written into the list header table 2-95.

When any list search for adds, deletes, or data request is interrupted by higher priority access to the SA TLB 2-86, such as a request for move-in of data to the buffer 2-08 or the move-out of data from the buffer 2-08, the pointer selector 2-124 does not select the TLB address from the second list pointer selector 2-111. In that case the interference register 2-114 stores the TLB address of the next TLB address to be accessed in a list search for presentation back to the stored pointer selector 2-116 for continuation of the search. The use of the interference register 2-114 improves the linked list searching means by preventing duplication of effort that would be required if the search had to begin over after an interruption.

Thus the linked list implementation of the reverse translation means shortens the length of the average search of the SA TLB 2-86 so that a search for synonym pages may be accomplished more quickly. Thus it can be seen that the reverse translation means of the present invention provides a means for assuring that the data delivered at a requested virtual address 2-76 represents the most up-to-date version of the line of data when the data may exist in other storage units in a modified form.

An additional benefit of the preferred embodiment arises from the performance of reverse translation and linked list searching along page boundaries. Some operations of a data processing machine require access to all lines of data with a secondary storage unit which correspond to a given page in the primary storage unit. With the page table storage means of the preferred embodiment, page translations may be quickly accessed in the translation lookaside buffer (VA TLB 2-83 and SA TLB 2-86).

A number of operations are performed along page boundaries (see, *IBM System* 370 *Principles of Operation,* Id.) An example which demonstrates the preferred embodiment of the present invention is the key update operation. Pages of data are stored in the mainstore 2-03 along with a code called a key which is used to control access to the page of data in the mainstore 2-03. In the preferred embodiment of the present invention when a line from a page is written into the buffers 2-07, 2-08, the key for the page is stored in the TLB.

Thus in the preferred embodiment, when a key for a page must be updated, the page information of all synonym pages in the TLB must be accessed so the key may also be updated. The reverse translation means 2-153 is used to generate TLB addresses for all pages having the key updated. Control allows access to the VA TLB 2-83 and SA TLB 2-86 through the tag-2 2-99 for performance of the key update while ignoring line address information from the tag-2 2-99 and the buffers 2-07, 2-08. In this manner, all the entries in the TLB need not be searched for operations on page boundaries, such key update operations, because the linked list searching means of the present invention allows access only to the needed synonym page entries.

Further details of the preferred embodiment are set out in the APPENDIX entitled, "AMDAHL 580 MBC-Data Integrity Theory of Operation." attached hereto and incorporated by reference as if fully set forth herein.

While the invention has been particularly shown and described with reference to the preferred embodiments thereof, it will be understood by those skilled in the art that various changes in form and in detail may be made therein without departing from the spirit and scope of the invention.

We claim:
1. In a data processing machine, an apparatus for storing data, comprising:
   a primary storage means for storing data;
   primary addressing means for uniquely addressing said data with unique primary addresses;
   secondary storage means for storing data in communication with said primary storge means so that data may be transferred between said primary storage means and said secondary storage means,
   secondary addressing means for addressing said secondary storage means with secondary addresses;
   forward translation means for translating said secondary addresses to said unique primary addresses to uniquely address said data; and
   reverse translation means for translating said unique primary addresses to synonym secondary addresses which translate to said unique primary addresses.
2. The apparatus of claim 1, wherein
said primary addresses include page addresses; and
said primary addressing means addresses said primary storage means by page addresses;
said forward translation means translates said secondary addresses to said unique primary addresses on page boundaries; and
said reverse translation means translates each said unique page primary address to secondary page addresses.
3. The apparatus of claim 1, wherein:
said primary addresses include page addresses;
page table storage means for storing the translation of said secondary addresses to said page address; and
said reverse translation means includes page table search means for searching said page table storage means for said synonym secondary addresses along page boundaries.
4. The apparatus of claim 3, wherein:
said reverse translation means further includes list means for associating groups of said page addresses in said page table storage means; and
said page table search means includes list search means for limiting said page table search to said page addresses associated by said list means.
5. The apparatus of claim 3, wherein:
said secondary storage means stores lines of data; and
said page table storage means is associated with each line of data in said secondary storage means.
6. The apparatus of claim 3, wherein:
said reverse translation means includes page addressing means for accessing lines of data in said secondary storage means which translate to a selected primary page address.
7. The apparatus of claim 2 wherein:
said reverse translation means further includes list means for associating groups of said page addresses in said page table storage means; and
said reverse translation means includes list search means for searching for said page addresses associated by said list means.
8. The apparatus of claim 2, wherein:
said primary addresses include page and line addresses;
said forward translation means includes line table storage means for storing the translation of said secondary addresses to said line addresses; and
page table storage means for storing the translation of said secondary addresses to said page address; and
said reverse translation means includes page table search means for searching said page table storage means for said synonym secondary addresses along page boundaries; and
line table serach means for searching said line table storage means for said synonyms secondary addresses along line boundaries.
9. The apparatus of claim 1, wherein:
said primary addresses include page and line, and byte addresses; and
said reverse translation means includes a page table storage means for storing translations to a primary page address for each said secondary addresses that address data in said secondary storage means.
10. The apparatus of claim 1, wherein:
said secondary storage means includes a plurality of fast access storage units.
11. The apparatus of claim 9, further including:
a tag field associated with said secondary storage means for identifying the entries in said page table storage means which store the primary page address of the data lines in said secondary storage means; and
said reverse translation means includes tag search means for searching said tag field to detect said secondary addresses which translate to a chosen one of said primary page addresses.

12. The apparatus of claim 9, further including:
a tag field associated with said secondary storage means for identifying the entries in said page table storage means which store the primary page address of the data lines in said secondary means; and
said reverse translation means includes a duplicate tag storage means for storing a duplicate of said tag field for access by said reverse translation means; and tag search means for searching said duplicate tag storage means to detect said secondary addresses which translate to a chosen one of said primary page addresses.

13. The apparatus of claim 1, wherein:
said secondary storage means is a fast access buffer storage unit; and
said primary storage means is a large capacity main-store.

14. The apparatus of claim 1, further including:
first tag storage means for storing a tag field associated with said secondary storage means for identifying primary page addresses of data in said secondary means; and
said reverse translation means further including second tag storage means for storing a duplicate of said tag field in said first tag storage means whereby said second tag storage means can be searched in the background without interfering with the operation of said first tag storage means.

15. The apparatus of claim 1, further including:
a tag field associated with said secondary storage means for identifying entries in said secondary storage means; and
said reverse translation means includes tag search means for searching said tag field to detect secondary addresses which translate to said primary addresses.

16. The apparatus of claim 15, wherein:
said secondary storage means includes two or more buffers each having entries identified by said tag field.

17. The apparatus of claim 15, wherein:
said buffers include an instruction fetch buffer and include an operand fetch buffer.

* * * * *